June 18, 1935.     C. R. PIEPER     2,005,239
GUY ANCHOR
Filed Nov. 17, 1930
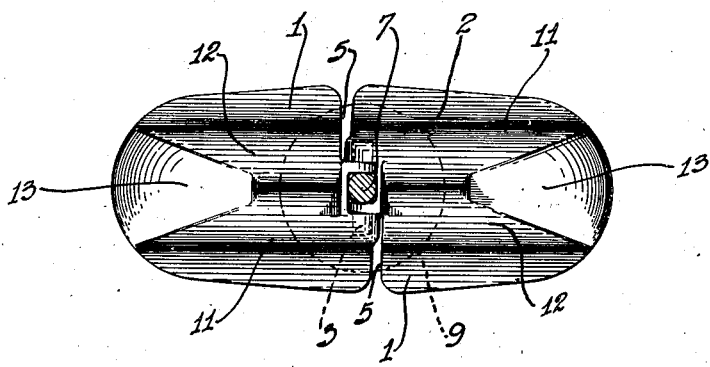
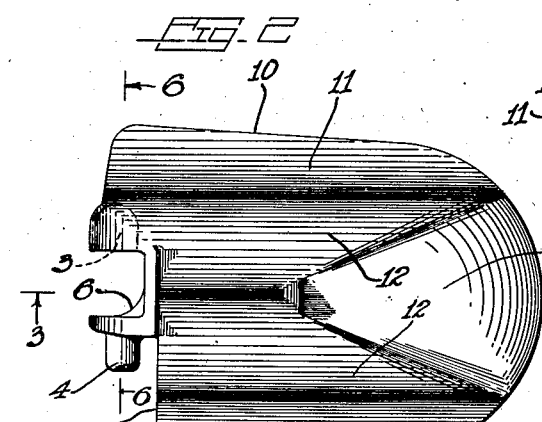
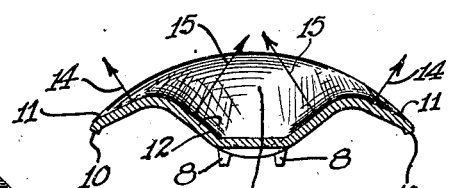
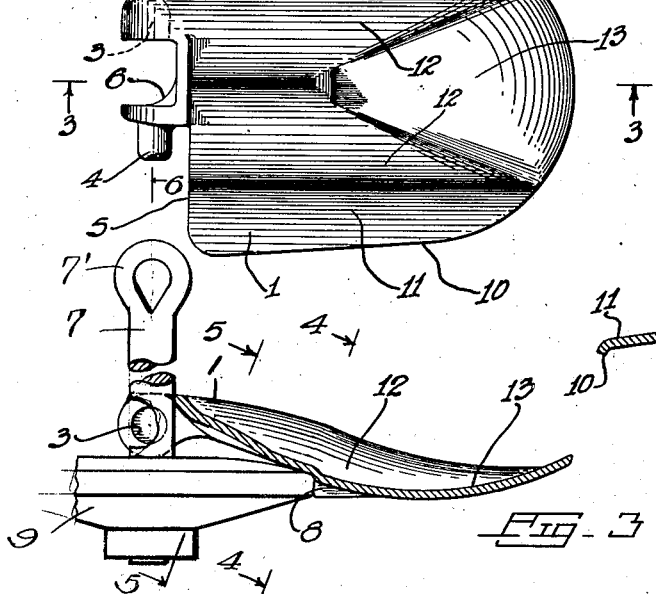
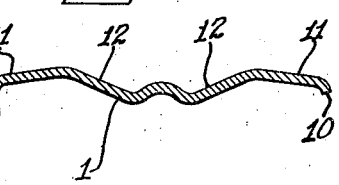
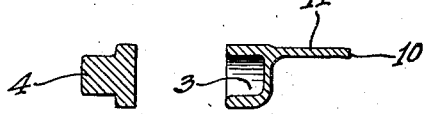
Chester R. Pieper
INVENTOR
BY Munn & Co.
ATTORNEYS Patented June 18, 1935

2,005,239

UNITED STATES PATENT OFFICE 2,005,239

GUY ANCHOR

Chester R. Pieper, La Crosse, Wis.

Application November 17, 1930, Serial No. 496,271

3 Claims. (Cl. 189—92)

My invention relates to guy anchors and includes among its objects and advantages an improvement in the blade shape of the type of anchor described in United States Patent 1,123,368, particularly with respect to getting more effective engagement with the superincumbent earth, and avoiding any tendency to work up or inch through the earth as a result of intermittent application of the load.

My invention is illustrated in the accompanying drawing, forming part of this application, in which Figure 1 is a plan view of a pair of blades operatively associated and embodying my invention, Figure 2 is an enlarged plan view of one of the blades, Figure 3 is a sectional view taken along the line 3—3 of Figure 2, showing the manner in which the blades are locked in expanded position, Figure 4 is a sectional view taken along the line 4—4 of Figure 3, Figure 5 is a sectional view taken along the line 5—5 of Figure 3, and Figure 6 is a sectional view taken along the line 6—6 of Figure 2.

In carrying out my invention, I make use of a pair of blades 1 and 2 which are preferably cast. Each blade is provided with a socket 3, see Figures 2 and 6, and a bearing element 4. The bearing element associated with one blade is disposed within the socket of the corresponding blade when the blades are arranged in operative relation, as shown in Figure 1. The blades are cast shorter upon one side, as shown at 5, which permits the blades to be assembled by a movement in a direction at right angles to the longitudinal axes.

Each blade is provided with a curved centering element 6, see Figure 2. This construction permits the blades to be properly centered upon an anchor rod 7 shown in Figure 1. The centering elements 6 are oppositely positioned when the blades are placed in assembled relation.

Each blade is formed with a pair of abutments 8, see Figures 3 and 4. The abutments 8 are arranged to engage the peripheral edge of the spreader element 9 when the blades have been expanded to the position indicated in Figure 3. The blades are pivotally connected so that they may be folded upon the anchor rod preparatory to lowering the assembly into a hole in the ground. When the spreader rests upon the bottom of the hole the blades may be expanded by an endwise movement in sliding engagement with the spreader to a position substantially at right angles to the rod. The blades are shaped to make a clean cut in the solid earth surrounding the opening without material displacement of the earth adjacent the blades. Any suitable tool may be employed for tamping on the blades to move them to their expanded position.

One end of the anchor rod 7 is fixedly connected with the spreader, while the opposite end projects beyond the surface of the ground to permit access to the eye 7' after installation. In referring to Figure 4, it will be noted that the sides of the blades are turned down slightly for providing a flange 10. The flanges extend substantially the entire length of the sides. The ends of the blades are of course cast without the flanges, since such flanges at these points would tend to retard and interfere with the movement of the blades into the earth.

The flanges 10 reinforce the blades against bending. In addition to this, the flanges strengthen the blade construction so that a minimum amount of material is necessary.

Each blade is provided with a plurality of bearing surfaces 11, 12, and 13. Figures 4 and 5 illustrate this specific formation. The surfaces 11 incline downwardly, while the surfaces 12 incline downwardly and inwardly with respect to the longitudinal axis of the blade. The surface 13, which is associated with the end of the blade, inclines downwardly and inwardly and merges with the surfaces 12. The curved cutting edge of the surface 13 merges smoothly into the relatively straight side edges of the wings 11. After the anchor has been dropped into the hole in the ground and properly expanded, the hole is filled with dirt and the dirt is of course packed. Any strain upon the anchor rod will tend to compress the soil directly above the blades and pack it into a more solid mass. The blade construction diverts the compression of the soil incident to such strain into a large mass. The compression of the soil is brought about in different directions, as indicated by arrows 14 and 15. The compressing influence of the surfaces 11, 12, and 13 is at right angles to these surfaces. The compressing influence of the surfaces 11 is upwardly and outwardly, as indicated by the arrows 14, while the influence of the surfaces 12 is indicated by the arrows 15. The surfaces 12 and 13 provide a dished, or pocket construction near the butt of the spoon shape defined by said surfaces, which tends to hold the ground after it is compressed and also tends to prevent a wedging action of the blades and gradually working toward the surface of the ground. The arrows 15 indicate the direction in which the earth at these points receives the pull exerted upon the anchor.

Thus, after installation, each blade presents to the superincumbent soil, a shallow central cup, opening upwardly and at a small but material outward angle, as best illustrated in Figure 3. Too great an angle permits the upward pull to develop excessive lateral wedging forces, and when such forces are present, an intermittent pull will work the earth immediately adjacent the blade around the outer end of the blade and back under it, so that the anchor inches up slowly. This is more objectionable than the mere loss of holding power would indicate, because the progressive loosening of the guy wires repeatedly disturbs the distribution of forces throughout the entire system of which the anchor is a part. The outward inclination illustrated is not sufficient to cause such inching, but it does contribute materially to the tendency to let the anchor bear against the bottom of a conical mass of superincumbent earth of much greater weight than the earth geometrically enclosed within the space the blades would carve out if they were lifted.

The lateral wings 11 cause the blades to exert a similar tendency in a vertical plane at right angles to that of Figure 3. Because these wings extend only part way in to the center of the blade, it is possible to incline them somewhat more steeply than the outward inclination of the cup of Figure 3, as clearly indicated at either side of Figure 4.

In rigid or rocky soil, the shape of the blade is much less significant, and almost any shape that can be worked in by arcuate movement, as indicated in Patent 1,123,368, will hold very well. But in a soil that tends to be pulverulent, such as a sandy soil, or in a soil that tends to be plastic, such as a clayey soil, anchors according to Patent 1,123,368 will inch up more easily than those according to the present disclosure. This tendency is substantially eliminated by turning the blades more nearly horizontal, as in my Patent 1,936,337, but then the tendency is developed to lift out an almost cylindrical plug of earth of a cross section corresponding to the plan view of the anchor blades. The angularity increases the volume and mass of the body of earth that is effective to hold the anchor down, and if the limits given are not materially exceeded, no inching tendency is apparent.

Without further elaboration, the foregoing will so fully explain my invention, that others may, by applying knowledge current at the time of application, readily adapt the same for use under various conditions of service.

I claim:

1. In an earth anchor comprising blades, means for collapsing said blades to insert them in a hole, and means for subsequently expanding said blades to force them into the surrounding earth, a blade having a spoon-shaped central portion with its concavity facing up, said central portion having an arcuate outer end and relatively straight side edges, said blade having wings integral with said central portion and extending outwardly and downwardly from the side edges of said central portion, whereby said wings may push outwardly against a mass of superincumbent material defined by an inverted trapezoid, the outer edges of said wings forming smooth continuations of the end edge of said center portion, the center of the butt of said spoon-shaped portion being dished slightly upward, whereby said blade tends to turn as it is expanded into the earth with a slicing action and without material displacement of the earth perpendicular to its earth-engaging faces, locking lugs projecting from the bottom of the center of the central portion intermediate its ends, and means back of said dished butt portion for pivotal articulation with another blade, said means including two portions spaced to accommodate a shaft between them, one only of said spaced portions having a web with an arcuate concave inwardly facing edge adjacent to said shaft.

2. In an earth anchor, a blade having a cupped area extending substantially the entire length of the blade, the sides of said blade being bent outwardly and downwardly to cooperate with said cupped area for defining a plurality of wedge-shaped areas, said blade entering the solid earth by an endwise movement without material displacement of the earth adjacent its surfaces.

3. In an earth anchor of the type having blades adapted to slide edgewise into position by a substantially arcuate movement guided by the earth into which they enter, a blade having side edge portions inclined outwardly and downwardly and a central portion cupped to be concave upwardly.

CHESTER R. PIEPER.